INVENTOR
IGOR I. SIKORSKY
BY Jack N. McCarthy
AGENT

June 21, 1960 I. I. SIKORSKY 2,941,605
AUTOMATIC PITCH CONTROL AND RELEASE
Filed Aug. 29, 1956 3 Sheets-Sheet 2

INVENTOR
IGOR I. SIKORSKY
BY
AGENT

June 21, 1960  I. I. SIKORSKY  2,941,605
AUTOMATIC PITCH CONTROL AND RELEASE
Filed Aug. 29, 1956  3 Sheets-Sheet 3

INVENTOR
IGOR I. SIKORSKY
BY Jack N. McCarthy
AGENT

United States Patent Office 2,941,605
Patented June 21, 1960

2,941,605

AUTOMATIC PITCH CONTROL AND RELEASE

Igor I. Sikorsky, Easton, Conn., assignor to United Aircraft Corporation, East Hartford, Conn., a corporation of Delaware Filed Aug. 29, 1956, Ser. No. 606,917

10 Claims. (Cl. 170—160.16)

This invention relates to an automatic collective pitch control mechanism for the main rotor blades of the helicopter in which the mechanism places the rotor blades in proper pitch for autorotation when the rotor speed falls below a predetermined safe r.p.m. A means is also provided to manually override said automatic control when it is desirable to do so.

In helicopter operation, in the event of a loss of power in the engine, the pitch of the main rotor blades must immediately be set so that autorotation may take place. Autorotation is one of the most interesting of the flight phenomena found in rotary wing aircraft, for it gives the air craft its dependability and safety in the event of power failure. The nearer the helicopter is to the ground, the faster the blade setting has to be made. In the past it has been the practice to have the pilot of the helicopter control the blade pitch by manipulation of the collective pitch lever in the usual way; however, it has been found that on certain occasions it may be preferable to have the pitch reduced automatically, particularly if the pilot would not have his hand on the collective pitch lever at the moment of emergency.

An object of this invention is to provide a mechanism for automatically placing the rotor blades at the proper pitch for autorotation.

Another object of this invention is to provide a mechanism which will operate to move the collective pitch lever into its proper position for autorotation with the movement of said lever operating to properly position the blades through the usual collective pitch control system.

A further object of this invention is to provide a mechanism which is operative in response to rotor r.p.m. The mechanism will operate when it receives a signal that the rotor r.p.m. has dropped below a predetermined value to move the pilot's collective pitch lever into its proper position.

Another object of this invention is to provide a mechanism in which the pilot can override the automatic collective pitch selecting mechanism and move the pilot's collective pitch lever to place the pitch of the rotor blades at any desired position.

A further object of this invention is to provide a mechanism which will be rendered inoperative below a predetermined distance above ground level.

Other objects and advantages will be apparent from the specification and from the accompanying drawings which illustrate an embodiment of the invention.

Figure 1:
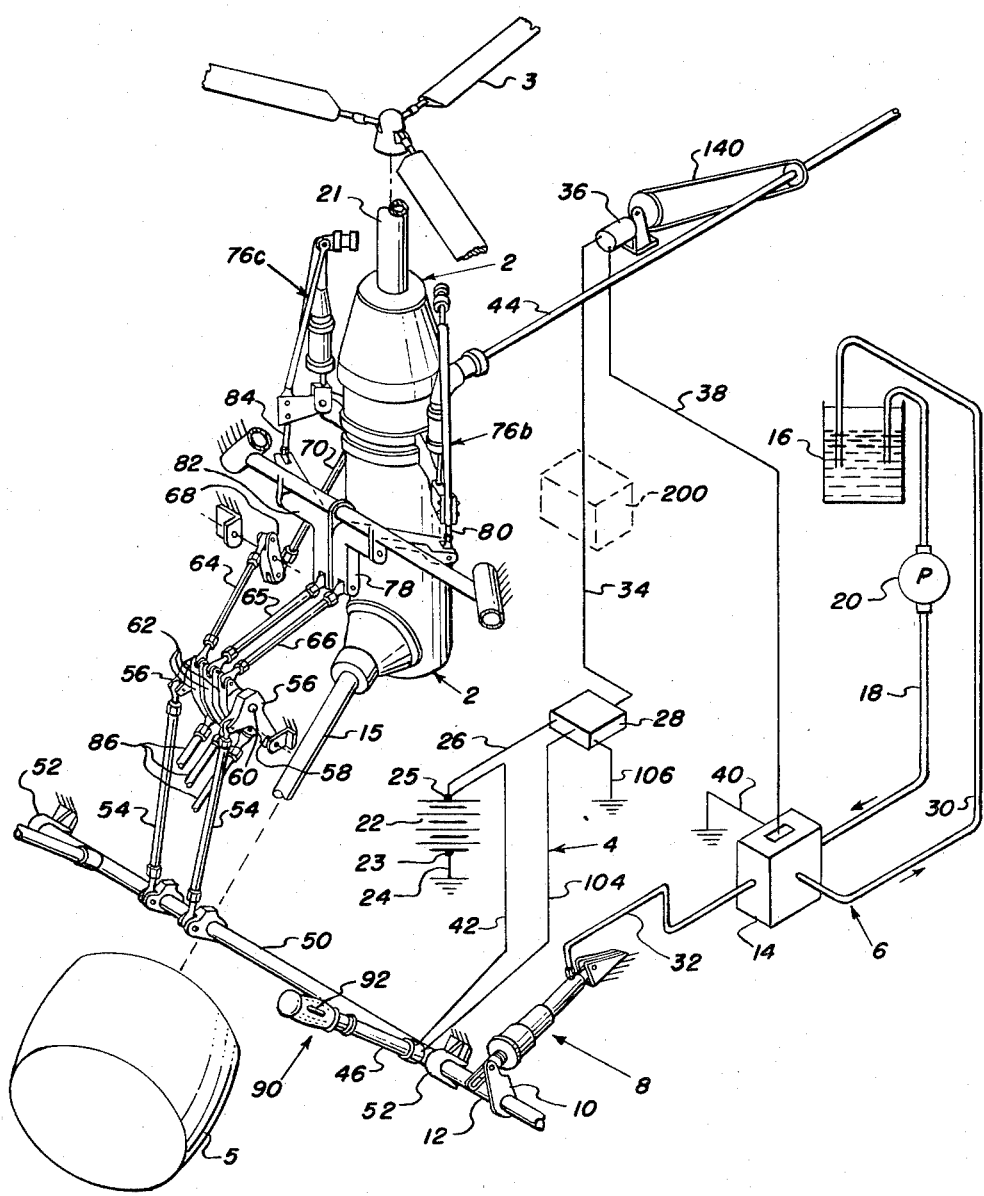
Fig. 1 is a perspective view of a portion of a helicopter control system with an embodiment of the invention connected thereto.
Figure 2:
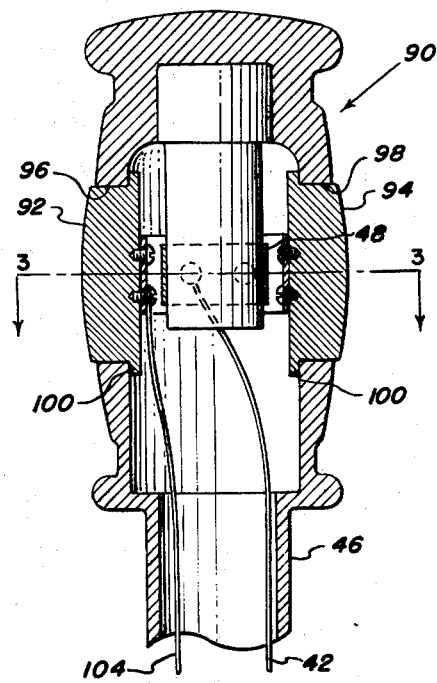
Fig. 2 is a sectional view of the handle of the collective pitch lever.
Figure 3:
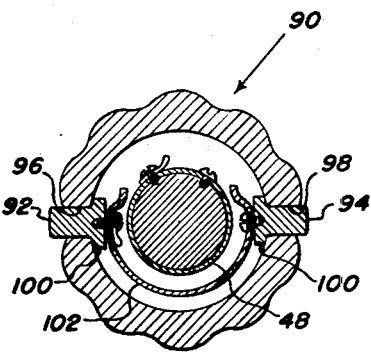
Fig. 3 is a sectional view taken along the line 3—3 of Fig. 2.

Fig. 1 shows a helicopter main gear box 2 which may be supported in a helicopter by any means desired. Gear box 2 is driven by an oblique shaft 15 which extends from an engine 5. For helicopter and control details, see U.S. application Serial No. 394,077 filed Nov. 24, 1953 for a Tail Rotor Pitch Control by Engine Manifold Pressure, of Igor S. Sikorsky, now U.S. Patent No. 2,811,212. Shaft 21 extends from the gear box upwardly and supports a main sustaining rotor which carries a plurality of variable pitch rotor blades 3. Extending rearwardly from the gear box 2 is a shaft 44 for use in driving a tail rotor assembly. Tail rotor shaft 44 is geared to the gear box 2 in such a manner so that the speed of said shaft is always directly proportional to the speed of the main rotor.

Further referring to Fig. 1 it will be noted that only the collective pitch control system has been entirely shown. The cyclic pitch control system is shown only in part since it is not necessary to illustrate the invention. The pitch control mechanism shown is similar to that shown in United States application Serial No. 570,736, filed March 12, 1956, for Hydraulic Booster Control, of Walter Gerstenberger. The collective pitch lever 46 fixed to shaft 50 rotates said shaft which is journalled in fixed bearings 52 causing the links 54 to rotate the two bell cranks 56 about the axis of shaft 58 which displaces the shaft 60 on which the three cyclic pitch control bell cranks 62 are pivoted. This movement of the levers 46 displaces all of the bell cranks 62 equally and simultaneously to move rods 64, 65 and 66. Rod 64 is connected to one arm of the bell crank 68, the other arm of which is connected to rod 70 which in turn is connected to a hydraulic servo mechanism. This hydraulic servo (not shown) is connected to one side of a conventional nonrotating swash plate element. Rod 66 is connected to one arm of a bell crank 78, the other arm of which is connected to a rod 80. Rod 80 is in turn connected to a hydraulic servo mechanism 76b. This hydraulic servo mechanism 76b is connected to the opposite lateral side of a conventional nonrotating swash plate element. Rod 65 is connected to one arm of a bell crank 82, the other arm of which is connected to a rod 84 which in turn is connected to a hydraulic servo mechanism 76c. This hydraulic servo mechanism 76c is connected to the forward part of a conventional nonrotating swash plate element. Movement of the three cyclic pitch bell cranks 62 is controlled by three rods 86 which are connected to a suitable cyclic pitch control mechanism (not shown).

The mechanism provided for moving the collective pitch lever into its proper position for autorotation and for releasing said collective pitch lever for normal operation comprises two main parts having an integrated operation: (1) an electrical system 4 and (2) a fluid operating system 6.

The fluid operating system 6 includes an operating cylinder and piston unit 8 which has one end pivotally connected to fixed aircraft structure and its other end connected to the free end of a crank arm 10 fixedly mounted on an extension 12 to shaft 50. This specific cylinder and piston unit and its connection will be described hereinafter in detail. The remainder of the fluid operating system 6 comprises a two-position solenoid operated valve 14 to which fluid is directed from a reservoir 16 by a conduit 18. A pump 20 in conduit 18 provides the proper operating fluid pressure and maintains said pressure. Valve 14 is normally biased to its first operating position which directs the fluid therethrough from conduit 18 to conduit 30. The fluid from conduit 30 is directed back into the reservoir 16. The valve 14 in its second operating position directs fluid therethrough from conduit 18 to conduit 32. Conduit 32 directs fluid therein to operating cylinder and piston unit 8. The valve 14 is placed in its second position when the solenoid therein is energized. The bias means in valve 14 returns the valve to its first operating position when the solenoid is de-energized. When valve 14 is in its first operating position conduit 32 is open to drain.

The integrated electrical system includes two circuits: (1) the circuit necessary to energize the solenoid in the two-position solenoid operating valve 14 and (2) the circuit necessary to deenergize the solenoid in said valve 14. A source of power 22 which is common to both circuits is connected at one terminal 23 by conduit 24 to ground. In the "energizing" circuit the source 22 is connected at its other terminal 25 by conduit 26 to one end of a switch biased to a normally closed position in a relay 28. The other end of said switch is connected by conduit 34 to a second switch which is opened or closed in response to engine speed. This switch forms part of the speed responsive mechanism 36 to be described hereinafter. The other end of said second switch is connected by conduit 38 to one end of the solenoid located in the two-position solenoid operated valve 14. The other end of said solenoid is connected by conduit 40 to ground.

A ground level, or altitude, responsive mechanism 200 can be placed in the "energizing" circuit. Said responsive mechanism 200 can include any ground level, or altitude, responsive device and a switch responsive to said device. The switch is biased to a "closed" position and is moved to an "open" position when said responsive device indicates a predetermined minimum distance or any distance below said minimum. This action prevents automatic operation of lever 46 by the speed responsive mechanism 36.

In the "de-energizing" circuit the terminal 25 of the source of power 22 is connected by conduit 42 to an annular contact 48 located within the handle 90 of the collective pitch lever 46. A pair of buttons 92 and 94 are mounted, diametrically opposed, on said handle with portions thereof projecting outwardly from the handle through openings 96 and 98 respectively. Flanges 100 on each of said buttons prevent the buttons from sliding out of said handle. A spring member 102 formed of generally semicircular shape is connected adjacent one end to button 92 and adjacent the other end to button 94. This spring member 102 serves to bias the buttons 92 and 94 outwardly into position and also serves as an electrical contact member for communication with the annular member 48. Member 102 is connected by conduit 104 to one end of a solenoid in relay 28. The other end of the solenoid in relay 28 is connected to ground by conduit 106. The relay 28 has its switch moved to an open position when the solenoid therein is energized. The bias means in relay 28 returns the switch to a closed position when the solenoid is de-energized.

The cylinder and piston unit 8 includes a piston 110 mounted within a cylinder 112. Conduit 32 is connected to the end of the cylinder which is pivotally mounted to fixed helicopter structure. A piston rod 114 is connected to the piston 110 and is slidably mounted in a bushing 116 threadably fixed in the other end of said cylinder. A spring 118 is positioned around said piston rod with one end abutting against the inner end of bushing 116 and the other end abutting against the opposing annular face of piston 110. Bushing 116 has an annular flange 121 extending radially outwardly from cylinder 112 to form a stop for the movement of crank arm 10 in an operating direction.

Figure 4:
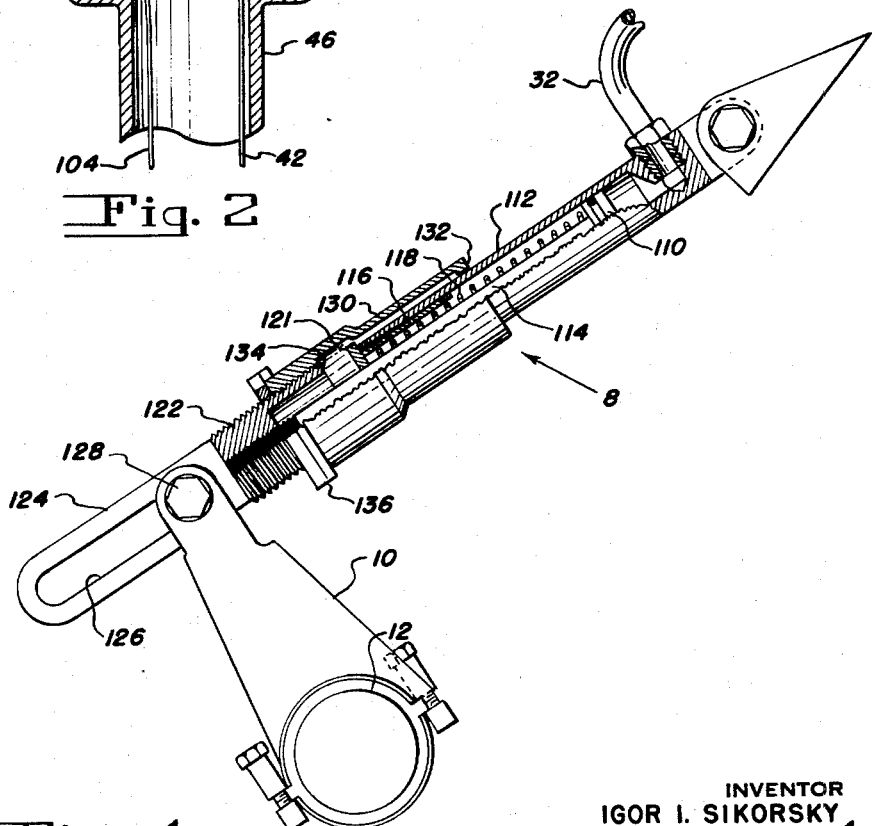
Fig. 4 is an enlarged view of the operating cylinder and piston unit partially in section.
Figure 5:
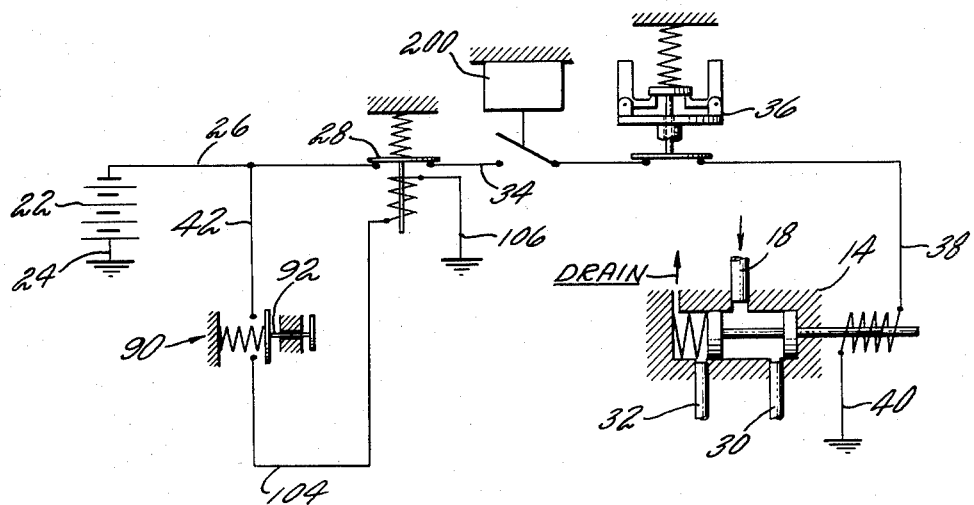
Fig. 5 is a wiring diagram of the electrical system set forth in Fig. 1.

Connected to the free end of piston rod 114 is a connecting member 122 which has projecting therefrom, away from piston rod 114, a connecting element 124 having an elongated slot 126 located therealong. When piston 110 and piston rod 114 are biased to the right as viewed in Fig. 4, the slot 126 is of such length so as to permit full movement of lever 46 without moving the piston. The free end of the crank arm 10 is connected to the element 124 by the use of a bolt 128 which passes through an opening in the free end of crank arm 10 and elongated slot 126. Element 124 has a sleeve 130 extending therefrom in a direction to surround annular flange 121 and a portion of cylinder 112. An inwardly extending flange 132 on sleeve 130 has its inner periphery located adjacent cylinder 112 at a point displaced radially inwardly from the outer periphery of flange 121. The end 134 of member 122 and the flange 132 form stroke limit stops which abut flange 121 at each end of relative axial movement between member 122 and cylinder 112.

Sleeve 130 is threadably mounted on element 124. It can be seen that by rotating sleeve 130 on element 124 the distance between the end 134 of said element and flange 132 of said sleeve can be varied thereby varying the position at which arm 10 will be placed at the end of an operating stroke of piston 110. A stroke adjustment lock nut 136 fixes sleeve 130 in its proper position so that when said cylinder and piston unit 8 is actuated blades 3 will be placed at their proper pitch setting for autorotation.

The speed responsive mechanism 36 can include any speed responsive device and a switch responsive to said device. The switch is forced to a "closed" position by the speed responsive device when the rotor is operating at or below a predetermined minimum speed. This connects conduit 34 to conduit 38. When the rotor is operating at a speed greater than the predetermined minimum, the switch is positioned at an "open" position, thereby preventing contact between conduit 34 and conduit 38. The speed responsive device is shown driven by a belt 140 from the tail rotor shaft 44.

*Operation*

As stated hereinbefore, in helicopter operation in the event of a loss of power in the engine or in the event of a reduction of r.p.m. of the main rotor blades in the helicopter for some other reason, the pitch of said blades must be immediately set so that autorotation may take place. For the purpose of disclosing operation, assume a helicopter to be in normal flight having installed therein subject invention. As said helicopter is in flight, due to either a loss of power in the engine or some other rotor failure, the r.p.m. of the main rotor blades reaches a value which is unsafe for further flight and necessitates setting of the blades at a proper pitch setting for autorotation. Speed responsive mechanism 36, which has been set to indicate a predetermined minimum r.p.m. of the main rotor blades, will close the switch therein and keep it closed at all r.p.m. below the predetermined r.p.m., connecting conduit 34 to conduit 38 thereby actuating the solenoid in the two-position solenoid operated valve 14 placing it in its second position.

Valve 14 then directs fluid from reservoir 16 through conduit 18 by the use of pump 20 to conduit 32. Conduit 32 in turn directs the fluid to the operating cylinder and piston unit 8, said fluid acting against piston 110 to move arm 10 through element 124 to a position which will move the pilot's collective pitch lever to its proper position for autorotation with the movement of said lever operating to properly position the blades through the usual collective pitch control system.

As the collective pitch lever is moved forwardly this movement signals the pilot that the rotation of the rotor blades has dropped below the minimum predetermined r.p.m. setting on the speed responsive mechanism 36. With this knowledge, if the pilot desires to resume control of the collective pitch control system he need only squeeze the handle 90 to depress buttons 92 and 94 and make contact between annular contact 48 and spring member 102. This action connects conduit 42 to conduit 104 and energizes the solenoid in relay 28 to move the switch therein to an open position which breaks the connection which conduit 34 had to the source of power 22. This in turn de-energizes the solenoid in the two-position solenoid operated valve 14 and the biased means in valve 14 is permitted to return the valve to a position which directs fluid from the reservoir 16 into conduit 30 where it is returned into the reservoir. Valve 14 is also placed so that conduit 32 is opened to drain. This connection to drain permits spring 118 to move piston 110 along with piston rod 114 to the right as viewed in Fig. 4 permitting the pilot to resume full control of movement of the collective pitch lever 46, within slot 126, and, therefore, of the collective positioning of the pitch of the blades.

It is to be noted that at any time the pilot releases his grip on the handle 90 so that the contact between annular member 48 and spring member 102 is broken, when the r.p.m. of the main rotor blades is below the predetermined minimum value set on the speed responsive mechanism 36, the solenoid in the two-position solenoid operated valve 14 will be actuated in the same manner described hereinbefore, thereby repositioning the collective pitch lever in its proper position for autorotation.

It is to be understood that the invention is not limited to the specific embodiment herein illustrated and described, but may be used in other ways without departure from its spirit as defined in the following claims.

I claim:

1. A rotary wing aircraft having in combination a rotor, rotor blades mounted on said rotor for pitch changing movement, collective pitch changing means for collectively controlling the pitch of said rotor blades, a collective pitch lever for actuating said collective pitch changing means, first means operatively connected to said lever responsive to a predetermined operative condition of said rotor indicating a need for autorotative flight for placing said lever in a position providing for autorotation, said last named means preventing movement of said lever to a position providing for a pitch increase of said rotor blades when it has placed said lever in a position providing for autorotation, and second means operatively connected to said first means for releasing said connection to permit movement of said lever to a position providing a pitch increase of said rotor blades.

2. A rotary wing aircraft having in combination a drive shaft, means for rotating said shaft, a rotor on said shaft, rotor blades mounted on said rotor for pitch changing movement, collective pitch changing means for collectively controlling the pitch of said rotor blades, a collective pitch lever for actuating said collective pitch changing means, first means operatively connected to said lever responsive to a predetermined operative condition of said shaft indicating a need for autorotative flight for restricting said lever to a position providing for autorotation, and second means operatively connected to said first means for releasing said connection permitting movement of said lever past the restriction of said connection.

3. In a helicopter having a rotor, rotor blades on said rotor and means for collectively controlling the pitch of said rotor blades, a collective pitch lever for actuating said collective pitch controlling means, first means operatively connected to said lever responsive to a rotor r.p.m. indicating a need for autorotative flight for moving said lever to a position whereby said blades are moved to an autorotative position through said means for collectively controlling the pitch of said rotor blades, and altitude responsive means connected to said first means for proventing the operation of said first means when said helicopter is at or below a predetermined altitude.

4. A rotary wing aircraft having in combination a rotor, rotor blades on said rotor, collective pitch changing means for collectively controlling the pitch of said rotor blades, a collective pitch lever for actuating said collective pitch changing means, means for moving said lever, said last named means including a cylinder and piston unit, said unit having one end connected to aircraft structure and the other end connected to said collective pitch lever, said unit being movable to a position placing said collective pitch lever in a position providing for autorotation, electrically controlled valve means connected to said unit for directing a fluid to said unit to move said unit to its position which places said lever in a position providing for autorotation, means connected to said rotor for determining the speed of said rotor, said last named means having means for sending a signal to said valve means to direct a fluid to said unit when the speed of said rotor has reached a value at which autorotation is desired, and manually operated means for cutting off a signal being sent to said valve means for resetting said valve means at a position providing for normal operation of said lever.

5. A rotary wing aircraft having in combination a rotor, rotor blades on said rotor, collective pitch changing means for collectively controlling the pitch of said rotor blades, a collective pitch lever for actuating said collective pitch changing means, means for moving said lever, said last named means including a cylinder and piston unit, said unit having one end connected to aircraft structure and the other end connected to said collective pitch lever, said unit being movable to a position placing said collective pitch lever in a position providing for autorotation, electrically controlled valve means for directing a fluid to said unit to move said unit to its position which places said lever in a position providing for autorotation, means for determining the speed of said rotor, said last named means having means for sending a signal to said valve means to actuate said unit when the speed of said rotor has reached a value at which autorotation is desired, and means for cutting off the signal from said means for sending a signal.

6. A rotary wing aircraft having in combination a rotor, rotor blades on said rotor, collective pitch changing means for collectively controlling the pitch of said rotor blades, a collective pitch lever for actuating said collective pitch changing means, hydraulic means for moving said lever to a position providing for autorotation, an electrically controlled means for actuating said hydraulic means, a source of electrical power, a speed responsive mechanism connected to said rotor for connecting said source to said electrically controlled means thereby actuating said hydraulic means when said rotor speed is at or below a predetermined value, and means connected to said source of power for disconnnecting said source from said electrically controlled means when the distance between the aircraft and the ground is at or below a predetermined value.

7. A rotary wing aircraft having in combination a rotor, rotor blades mounted on said rotor for pitch changing movement, collective pitch changing means having collective control of the pitch of said rotor blades, a collective pitch lever actuating said collective pitch changing means, first means connected to said lever for moving said lever to a position providing for autorotation, second means connected to said first means to actuate said first means to move said collective pitch lever to a position providing for autorotation, said second means having an electrically controlled device for sending an impulse to said first means to operate said first means, an electrical power supply, third means connecting said electrically controlled device to said power supply, a first switch in said third means for energizing said electrically controlled device, said first switch being responsive to an operating function of said aircraft indicating a need for autorotative flight, and a second solenoid operated switch in said third means for deenergizing said electrically controlled device.

8. A rotary wing aircraft having in combination a rotor, rotor blades mounted on said rotor for pitch changing movement, collective pitch changing means having collective control of the pitch of said rotor blades, a collective pitch lever actuating said collective pitch changing means, first means connected to said lever for moving said lever to a position providing for autorotation, second means connected to said first means to actuate said first means to move said collective pitch lever to a position providing for autorotation, said second means having an electrically controlled device for sending an impulse to said first means to operate said first means, an electrical power supply, third means connecting said electrically controlled device to said power supply, a first switch in said third means for energizing said electrically controlled device, said first switch being responsive to an operating function of said aircraft indicating a need for autorotative flight, a second solenoid operated switch in said third means for de-energizing said electrically controlled device, a solenoid operatively connected to said second switch, and fourth means for energizing said solenoid, said fourth means including a pair of manually operated contacts on the collective pitch lever.

9. A rotary wing aircraft having in combination a rotor, rotor blades mounted on said rotor for pitch changing movement, collective pitch changing means having collective control of the pitch of said rotor blades, a collective pitch lever actuating said collective pitch changing means, first fluid operated means connected to said lever for moving said lever to a position providing for autorotation, second means connected to said first means to actuate said first means to move said collective pitch lever to a position providing for autorotation, a fluid supply, said second means including a solenoid operated valve having two positions, a first position directing fluid from said supply to said first fluid operated means to control said first means, a second position cutting off fluid from said supply to said first fluid operated means, a first solenoid operatively connected to said valve, an electrical power supply, third means connecting the solenoid of said solenoid operated valve to said power supply, a first switch in said third means for energizing the solenoid of said solenoid operated valve and placing said valve in its first position, said first switch being responsive to an operating function of said aircraft indicating a need for autorotative flight, a second solenoid operated switch in said third means for de-energizing the solenoid of said solenoid operated valve, a second solenoid operatively connected to said second switch, and fourth means for energizing said solenoid of said second switch, said fourth means including a pair of manually operated contacts on the collective pitch lever.

10. A rotary wing aircraft having in combination a rotor, rotor blades mounted on said rotor for pitch changing movement, collective pitch changing means having collective control of the pitch of said rotor blades, a collective pitch lever actuating said collective pitch changing means, first fluid operated means connected to said lever for moving said lever to a position providing for autorotation, second means connected to said first means to actuate said first means to move said collective pitch lever to a position providing for autorotation, a fluid supply, said second means including a solenoid operated valve having two positions, a first position directing fluid from said supply to said first fluid operated means to control said first means, a second position cutting off fluid from said supply to said first fluid operated means, a first solenoid operatively connected to said valve, said valve being biased to its second position, an electrical power supply, third means connecting the solenoid of said solenoid operated valve to said power supply, a first switch in said third means for energizing the solenoid of said solenoid operated valve and placing said valve in its first position, said first switch being biased to an open position, said first switch being responsive to an operating function of said aircraft indicating a need for autorotative flight, a second solenoid operated switch in said third means for de-energizing the solenoid of said solenoid operated valve, a second solenoid operatively connected to said second switch, said second switch being biased to a closed position and fourth means for energizing said solenoid of said second switch to open it, said fourth means including a pair of manually operated contacts on the collective pitch lever.

References Cited in the file of this patent
UNITED STATES PATENTS
2,700,424   Campbell _____ Jan. 25, 1955